(12) United States Patent
Usui

(10) Patent No.: US 10,724,996 B2
(45) Date of Patent: Jul. 28, 2020

(54) POSITION LOCATION SYSTEM, POSITION LOCATION METHOD, AND NON-TRANSITORY COMPUTER READABLE STORAGE MEDIUM

(71) Applicant: KABUSHIKI KAISHA TOSHIBA, Tokyo (JP)

(72) Inventor: Takashi Usui, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 181 days.

(21) Appl. No.: 15/917,335

(22) Filed: Mar. 9, 2018

(65) Prior Publication Data
US 2018/0266999 A1 Sep. 20, 2018

Related U.S. Application Data

(63) Continuation of application No. PCT/JP2018/002489, filed on Jan. 26, 2018.

(30) Foreign Application Priority Data

Mar. 17, 2017 (JP) .................................. 2017-053736

(51) Int. Cl.
*G01S 5/22* (2006.01)
*G01N 29/44* (2006.01)
(Continued)

(52) U.S. Cl.
CPC .......... *G01N 29/14* (2013.01); *G01M 5/0033* (2013.01); *G01N 29/07* (2013.01);
(Continued)

(58) Field of Classification Search
CPC .... G01N 29/07; G01N 29/2412; G01N 29/42; G01N 29/4472; G01N 29/14;
(Continued)

(56) References Cited

U.S. PATENT DOCUMENTS

| 4,459,851 | A |   | 7/1984 | Crostack |
| 5,079,952 | A | * | 1/1992 | Nakaso ................. G10K 11/32 |
|   |   |   |   | 73/624 |

(Continued)

FOREIGN PATENT DOCUMENTS

| JP | 52-143882 A | 11/1977 |
| JP | 55-78249 A | 6/1980 |

(Continued)

*Primary Examiner* — Jacques M Saint Surin
(74) *Attorney, Agent, or Firm* — Finnegan, Henderson, Farabow, Garrett & Dunner, L.L.P.

(57) ABSTRACT

According to one embodiment, a position location system includes a plurality of sensors, a time measurement unit, an angle calculation unit, and a position location unit. The plurality of sensors are arranged at a predetermined sensor interval. The time measurement unit measures a difference in time at which elastic waves arrive at the plurality of sensors. The angle calculation unit calculates an incident angle at which the elastic waves are incident on the plurality of sensors on the basis of the time difference. The position locator locates a source of the elastic waves on the basis of the incident angle. The predetermined sensor interval is a distance determined on the basis of a sound velocity of elastic waves propagating in a structure in which the plurality of sensors are arranged and a frequency characteristic of the sensor.

8 Claims, 13 Drawing Sheets

(51) Int. Cl.
  *G01M 5/00* (2006.01)
  *G01N 29/07* (2006.01)
  *G01N 29/24* (2006.01)
  *G01N 29/42* (2006.01)
  *G01N 29/14* (2006.01)

(52) U.S. Cl.
  CPC ......... *G01N 29/2412* (2013.01); *G01N 29/42* (2013.01); *G01N 29/4472* (2013.01); *G01S 5/22* (2013.01); *G01N 2291/011* (2013.01); *G01N 2291/0258* (2013.01); *G01N 2291/0289* (2013.01)

(58) Field of Classification Search
  CPC ..... G01N 2291/011; G01N 2291/0289; G01N 2291/0258; G01M 5/0033; G01S 5/22
  USPC .......................................................... 73/587
  See application file for complete search history.

(56) References Cited

U.S. PATENT DOCUMENTS

| | | | |
|---|---|---|---|
| 5,528,557 A | 6/1996 | Horn | |
| 5,544,129 A | 8/1996 | McNelis | |
| 6,202,490 B1* | 3/2001 | Taniguchi | G01B 17/00 73/579 |
| 7,117,149 B1* | 10/2006 | Zakarauskas | G10L 17/26 704/233 |
| 7,633,052 B2* | 12/2009 | Nakamura | G01M 11/083 250/227.14 |
| 2005/0160785 A1* | 7/2005 | Umeda | G01P 21/00 73/1.39 |
| 2010/0251822 A1* | 10/2010 | Isobe | G01N 29/069 73/606 |
| 2012/0253697 A1* | 10/2012 | Frankenstein | G05B 23/0254 702/39 |
| 2016/0061931 A1 | 3/2016 | Sakamoto et al. | |
| 2016/0139084 A1 | 5/2016 | Usui et al. | |
| 2017/0138910 A1 | 5/2017 | Usui et al. | |

FOREIGN PATENT DOCUMENTS

| | | |
|---|---|---|
| JP | 59-168512 A | 9/1984 |
| JP | 4-15415 B2 | 3/1992 |
| JP | 2002-267740 A | 9/2002 |
| JP | 2003114219 * | 4/2003 |
| JP | 2009-204347 A | 9/2009 |
| JP | 2009-243894 A | 10/2009 |
| JP | 2013-134090 A | 7/2013 |
| JP | 2016-50847 A | 4/2016 |
| JP | 2016-99119 A | 5/2016 |
| WO | WO 2015/119498 A1 | 8/2015 |

* cited by examiner

POSITION LOCATION SYSTEM, POSITION LOCATION METHOD, AND NON-TRANSITORY COMPUTER READABLE STORAGE MEDIUM

CROSS-REFERENCE TO RELATED APPLICATION

This is a Continuation Application of International Application No. PCT/JP2018/002489, filed on Jan. 26, 2018, which claims priority to Japanese Patent Application No. 2017-053736, filed on Mar. 17, 2017, and the entire contents of all of the aforementioned applications are incorporated herein by reference.

FIELD

Embodiments described herein relate generally to a position location system, a position location method, and non-transitory computer readable storage medium.

BACKGROUND

In recent years, problems due to the aging of structures such as bridges constructed during a period of high economic growth have been revealed. Since the damage would be immeasurable in the unlikely event of an accident occurring in such structures, technologies for monitoring states of these structures have been proposed up to now. For example, a technology for detecting damage in the structure in an acoustic emission (AE) method of detecting elastic waves caused by the occurrence of internal cracks or the progress of internal cracks using a high sensitivity sensor has been proposed. AE is elastic waves caused by the progress of fatigue cracks in a material. In the AE method, elastic waves are detected as an AE signal (voltage signal) by an AE sensor using a piezoelectric element. The AE signal is detected as a sign before breakage of a material occurs. Therefore, the frequency of occurrence and the signal intensity of an AE signal are used as indicators which represent the soundness of the material. For this reason, a technology for detecting an indication of the deterioration of a structure in the AE method has been studied.

As one of damage evaluation methods using an AE signal, location of the oscillation source position of elastic waves using a difference in time at which a signal arrives at a plurality of sensors is often performed. Identifying the oscillation source position of elastic waves leads to the identification of a damaged portion and is of major significance. In order to perform the location of an AE source position, it is necessary to ascertain the propagation velocity of elastic waves, but, unlike sound velocity in air, the velocity of elastic waves that propagate in solids depends on the internal structure, and there are some materials having anisotropy, and thus it is extremely difficult to ascertain an accurate velocity. A position location method based on a sound source is known as means for solving such problems. However, a detection resolution largely changes depending on an arrival direction in this method. In addition, a so-called dead band in which elastic waves cannot be completely detected depending on a direction may occur. As described above, since a range of directions in which detection is possible is limited in a conventional method, a measurement range may be limited in some cases.

DETAILED DESCRIPTION

An object of the present invention is to provide a position location system, a position location method, and a non-transitory computer readable storage medium in which a measurement range of elastic waves can be expanded without there being an effect due to dead bands.

According to one embodiment, a position location system includes a plurality of sensors, a time measurement unit, an angle calculation unit, and a position location unit. The plurality of sensors are arranged at a predetermined sensor interval. The time measurement unit measures a difference in time at which elastic waves arrive at the plurality of sensors. The angle calculation unit calculates an incident angle at which the elastic waves are incident on the plurality of sensors on the basis of the time difference. The position locator locates a source of the elastic waves on the basis of the incident angle. The predetermined sensor interval is a distance determined on the basis of a sound velocity of elastic waves propagating in a structure in which the plurality of sensors are arranged and frequency characteristics of the sensor.

Hereinafter, a position location system, a position location method, and a non-transitory computer readable storage medium of the present embodiment will be described with reference to drawings.

(Outline)

First, an outline will be described.

Figure 1A:
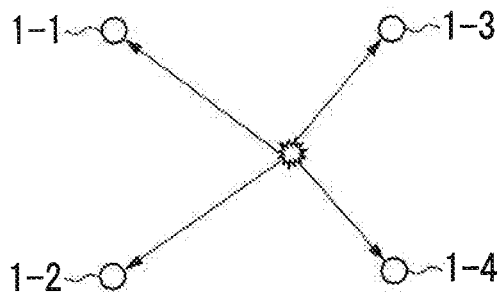
FIG. 1A is a diagram which describes an outline of a conventional position locating method for the transmission source of elastic waves.
Figure 1B:
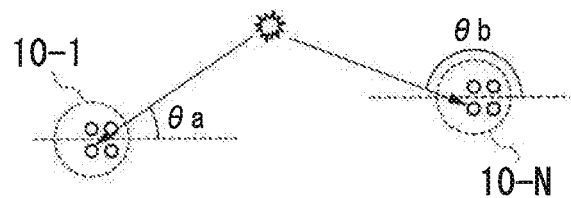
FIG. 1B is a diagram which describes an outline of a position location method for the transmission source of elastic waves according to the present embodiment.

With reference to FIGS. 1A and 1B, an outline will be described of a conventional position location method for the transmission source of the elastic waves and a position location method for the transmission source of elastic waves according to the present embodiment. FIG. 1A is a diagram which describes an outline of a conventional position location method for the transmission source of elastic waves. FIG. 1B is a diagram which describes an outline of a position location method for the transmission source of elastic waves according to the present embodiment.

In the conventional position location method as shown in FIG. 1A, a plurality of sensors 1-1 to 1-4 are arranged to surround an object subjected to position location. Then a position of the transmission source of elastic waves is located on the basis of a difference in arrival time of elastic waves to each of the sensors 1-1 to 1-4. In the conventional position location method, strict time synchronization between sensors is required, and there needs to be a wired connection from the sensors to a signal processing unit which processes sensor signals. In addition, in the conventional position location method, information on an accurate propagation velocity is required.

On the other hand, as shown in FIG. 1B, a direction of elastic waves is detected using an unit in which sensors are arranged close to each other (hereinafter, referred to as "vector sensing unit") 10-1 to 10-N (N is an integer of 2 or greater), and a position of the transmission source of elastic waves is located on the basis of an angle (for example, θa, θb) detected by each of a plurality of vector sensing units in the position location method according to the present embodiment.

Figure 2:
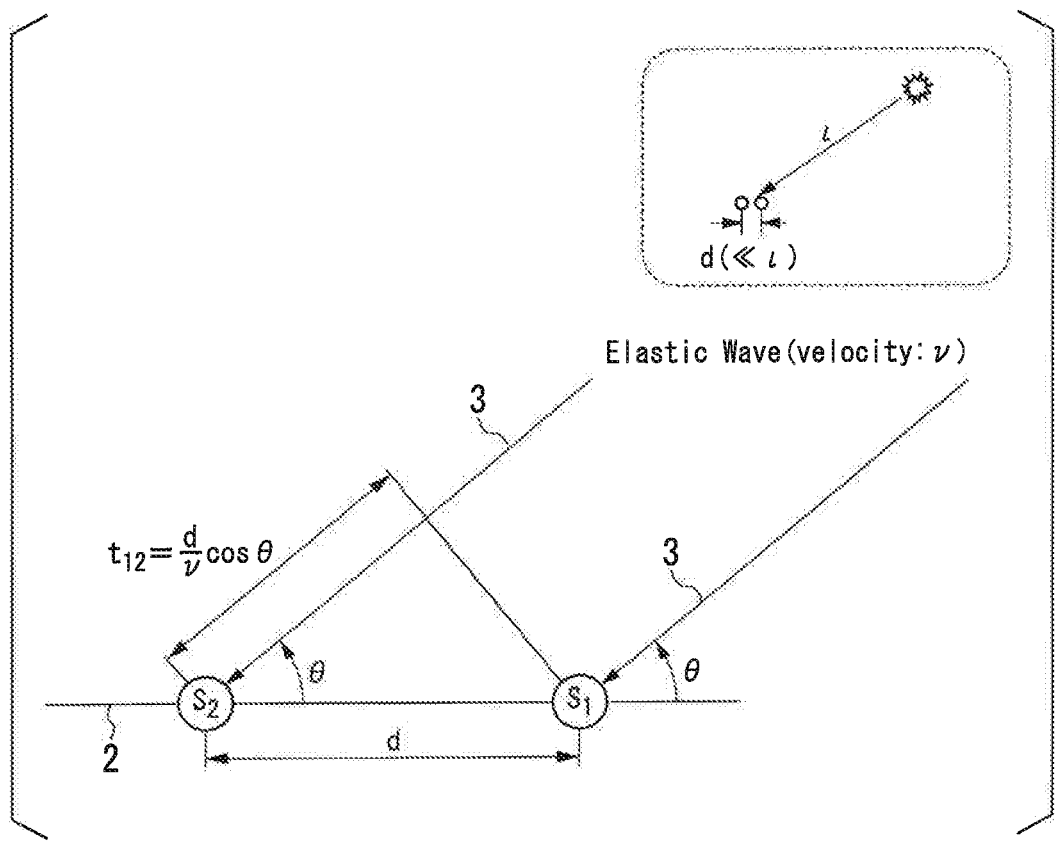
FIG. 2 is a diagram which describes a basic concept of vector sensing in a vector sensing unit.
Figure 3:
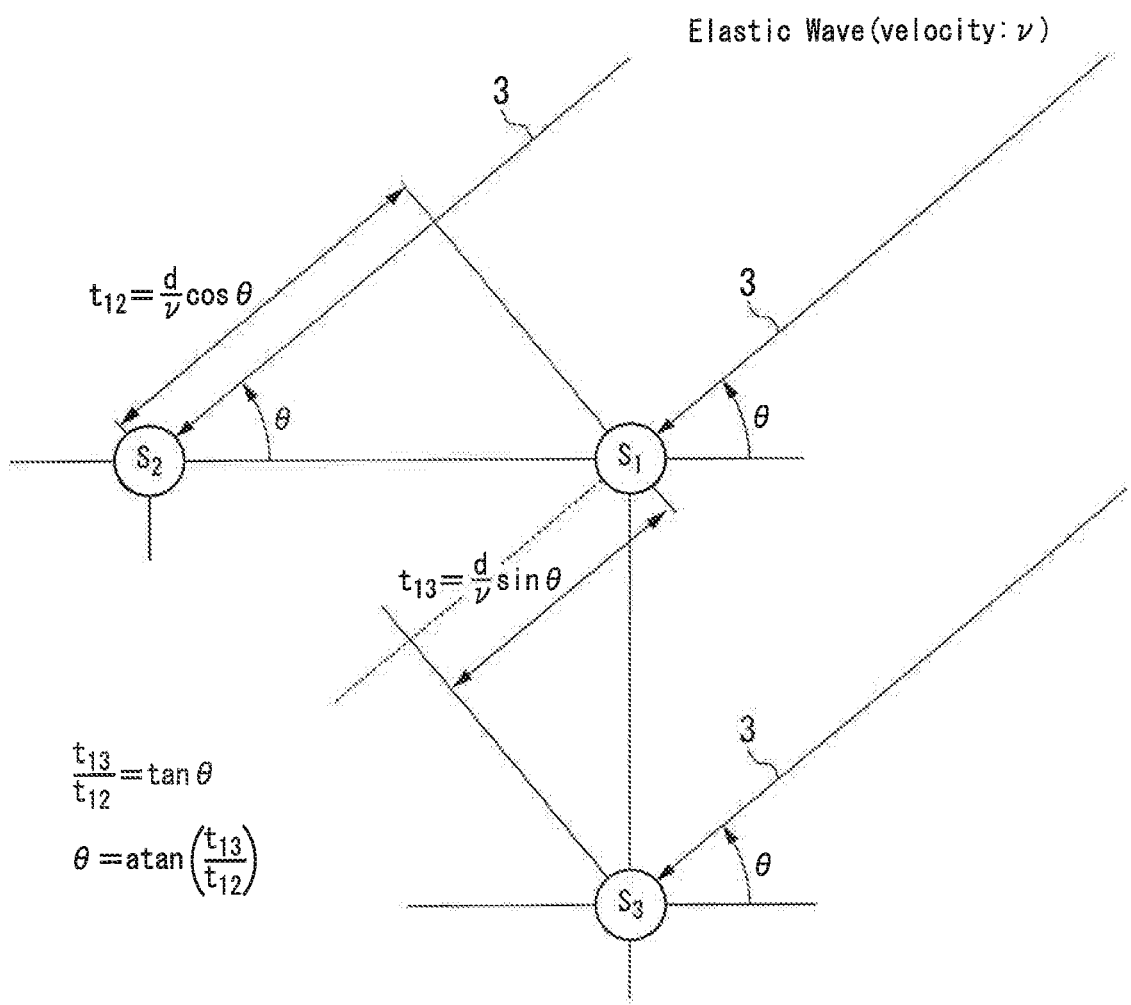
FIG. 3 is a diagram which describes the basic concept of vector sensing in a vector sensing unit.

Here, a basic concept of vector sensing in a vector sensing unit used in the present embodiment will be described using FIGS. 2 and 3. FIGS. 2 and 3 are diagrams which describe the basic concept of vector sensing in a vector sensing unit.

First, as shown in FIG. 2, if a plurality of sensors S1 and S2 are brought close to each other, an elastic wave 3 arrives at each of the sensors S1 and S2 at an arbitrary angle θ with respect to a line segment 2 connecting the sensor S1 and the sensor S2. At this time, a distance from each of the sensors S1 and S2 to a transmission source of elastic waves is set to be 1 and a sensor interval is set to be d (<<1).

The sensor interval d needs to be arranged such that d<<rmax is satisfied when the inside of a circle with a radius rmax centered on a unit (the sensor S1 and the sensor S2 in FIG. 2) is assumed as a measurement range. Moreover, it is possible to set a range with a radius rmin or more centered on the unit as a measurement range, and, in this case, d<<1 can be secured rather than rmin<1<rmax by setting d<<rmin<<rmax.

Furthermore, it is desirable that elastic waves of the same quality as far as possible be incident on a plurality of sensors arranged close to each other, but actual elastic waves propagate while losing energy due to the influence of internal friction or the like during each of cycles of the vibration thereof. In order that there be no effects due to attenuation, it is desirable that the sensor interval d be an interval smaller than an assumed wavelength λ of elastic waves. That is, the sensor S1 and the sensor S2 are arranged such that d>λ is satisfied, and thereby elastic waves incident on the sensor S1 and the sensor S2 can be regarded as being of the same quality.

It is known that the velocity v of elastic waves depends on the inherent physical property value of a material, and is about 3000 to 6000 m/s if the material is a metal. In addition, a signal of naturally occurring elastic waves generally includes a wide frequency range, but it is possible to select a frequency to be observed by providing a band pass filter in an electrical circuit which processes frequency characteristics of a sensor itself and sensor signals to remove noise. The frequency to be observed is selected according to a material so as to be, for example, 150 kHz in the case of a metal, and 30 kHz in the case of a concrete structure. As an example, when the velocity v of elastic waves is set to be 3000 m/s and the frequency to be observed is set to be 150 kHz, the wavelength λ is 20 mm based on λ=v/f, and the influence of attenuation can be minimized by arranging the sensors such that d is 20 mm or less.

A time difference t12 in time at which elastic waves arrive at two sensors S1 and S2 can be expressed as Equation 1 using the velocity v of elastic waves.

[Math. 1]

$$t_{12} = \frac{d}{v}\cos\theta \qquad \text{(Equation 1)}$$

In addition, an incident angle θ can be obtained by transforming Equation 1 into Equation 2.

[Math. 2]

$$\theta = \arccos\left(\frac{v \cdot t_{12}}{d}\right) \qquad \text{(Equation 2)}$$

Furthermore, as shown in FIG. 3, if three sensors S1, S2, and S3 are arranged, the incident angle θ can be obtained by the following Equations 3 to 5, and can be obtained only from a ratio between the time differences t12 and t13 between the sensors without depending on the propagation velocity v of the elastic wave 3.

[Math. 3]

$$t_{12} = \frac{d}{v}\cos\theta \qquad \text{(Equation 3)}$$

$$t_{13} = \frac{d}{v}\sin\theta \qquad \text{(Equation 4)}$$

$$\theta = \arctan\left(\frac{t_{13}}{t_{12}}\right) \qquad \text{(Equation 5)}$$

However, in the case of FIG. 3, there is a so-called dead band in which almost no change in time difference according to change in angle is obtained due to the incident angle θ. Considering two simple sensors as shown in FIG. 2, the time difference t12 is as shown in Equation 1, but Equation 6 is obtained when Equation 1 is differentiated with respect to the angle θ.

[Math. 4]

$$\frac{dt_{12}}{d\theta} = -\frac{d}{v}\sin\theta \quad \text{(Equation 6)}$$

Figure 4:
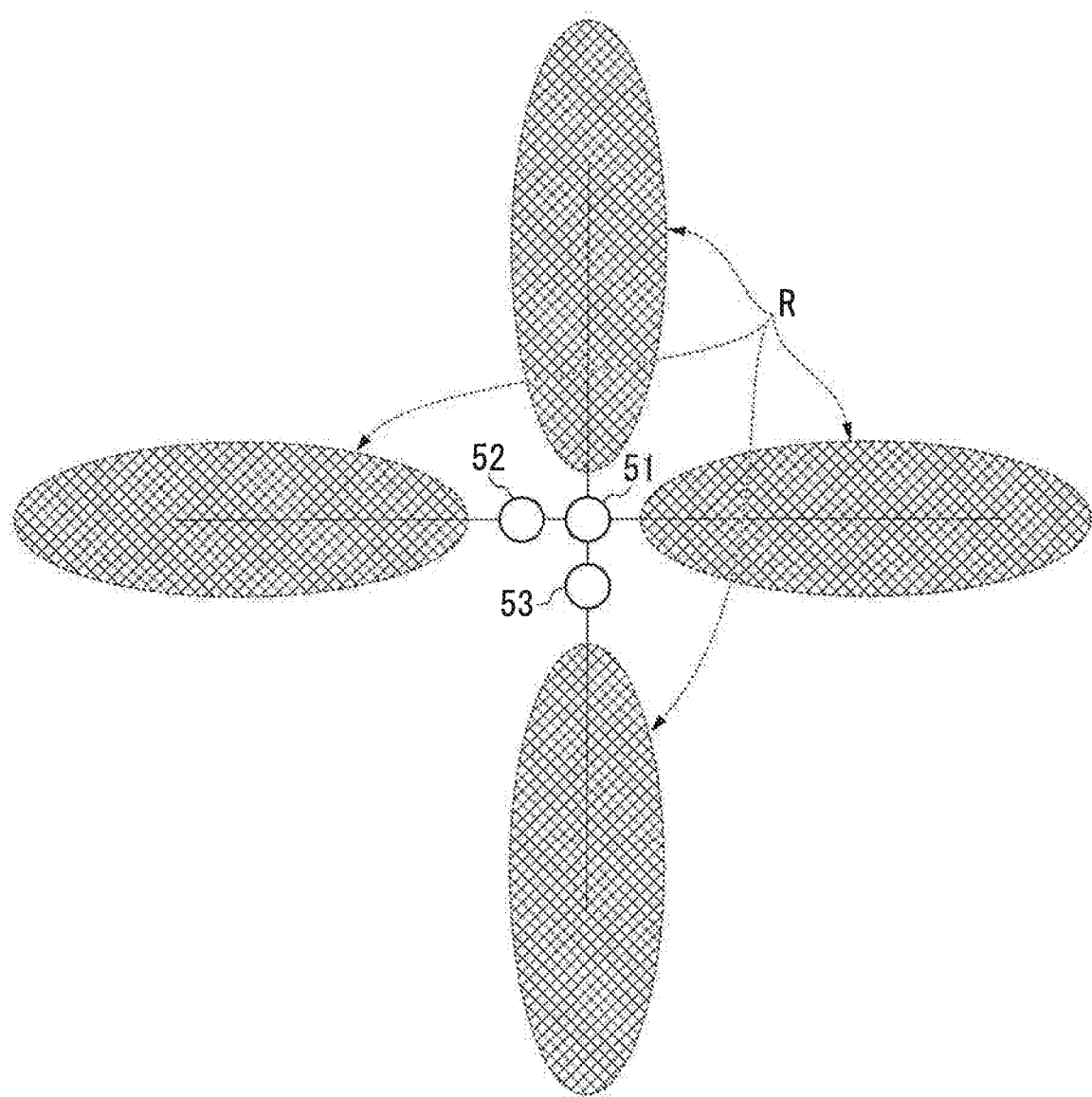
FIG. 4 is a diagram which shows an image of a dead-band region when three sensors are arranged.

From Equation 6, it can be shown that dt12/dθ=0 when elastic waves have been incident at θ=0 from around π, that is, there is almost no change in the time difference t12 with respect to change in angle. From the description above, it can be understood that a dead band is in a direction of an extension line of a line segment connecting sensors. FIG. 4 is a diagram which shows an image of dead-band regions when three sensors are arranged. As shown in FIG. 4, when three sensors S1, S2, and S3 are arranged such that straight lines connecting the sensors go straight, regions R on the extension lines of line segments connecting the sensors S1, S2, and S3 are dead bands and the angles cannot be accurately determined.

(Details)

For problems described in the outline, a dead band may be eliminated by adding one more sensor and selectively using it in the present embodiment. For example, a dead band may be eliminated with the minimum number of sensors by arranging sensors such that straight lines connecting each of the sensors are not parallel.

Figure 5:
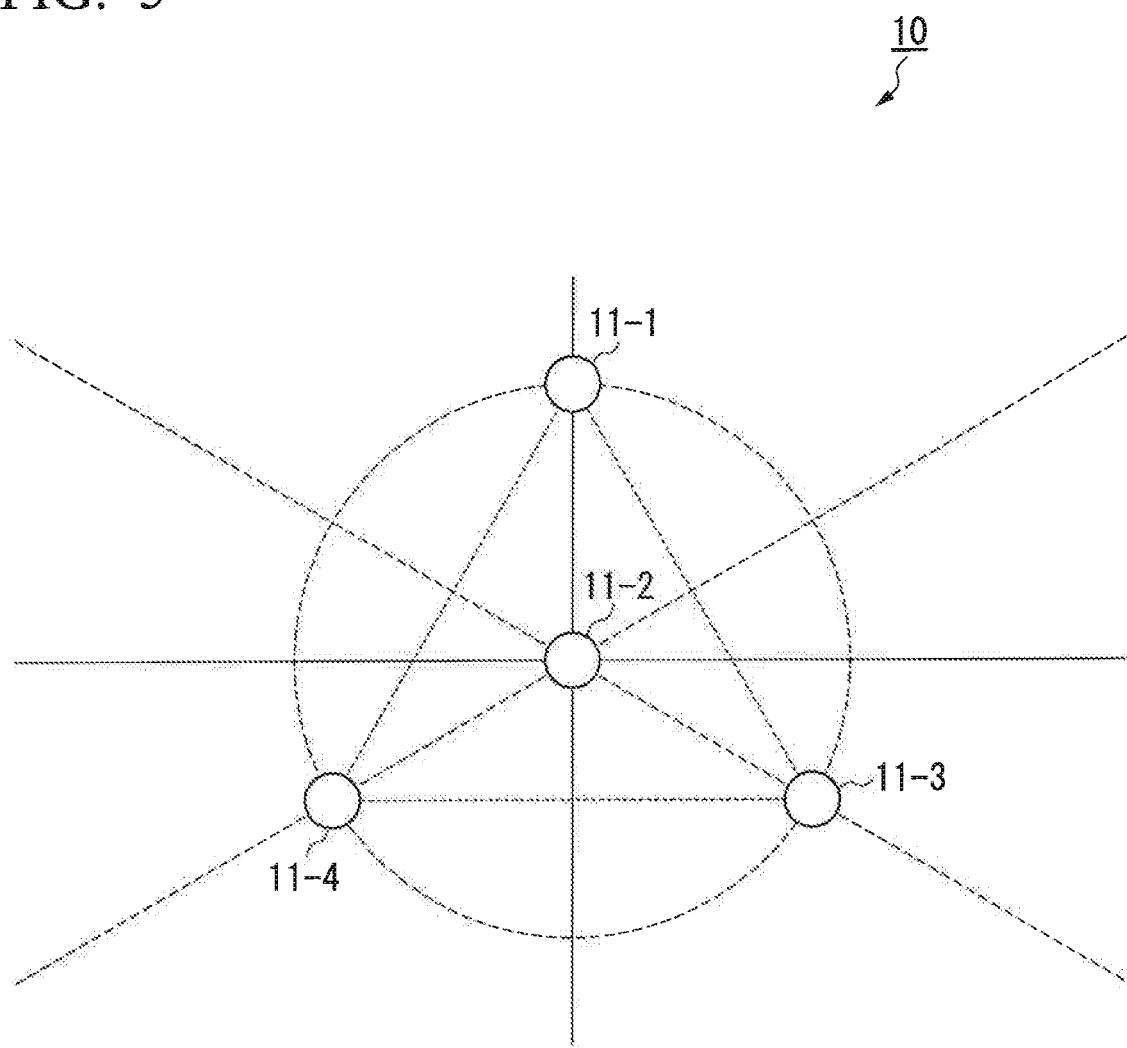
FIG. 5 is a diagram which shows an arrangement example of sensors in a vector sensing unit 10 according to the present embodiment.

FIG. 5 is a diagram which shows an arrangement example of sensors in a vector sensing unit 10 according to the present embodiment. As shown in FIG. 5, sensors 11-1 to 11-4 in the vector sensing unit 10 are arranged at four places in total such as three vertexes of an equilateral triangle, and a centroid position of the equilateral triangle in the present embodiment. With such an arrangement, lane segments connecting the sensors and the extension lines of the line segments intersect each other at an angle of at least 30° or more, and a dead band can be eliminated using a combination of any of the sensors. Moreover, an arrangement interval d of the respective sensors 11-1 to 11-4 in the vector sensing unit 10 satisfies a relationship of d<v/f using the propagation velocity v of elastic waves and the frequency f to be observed, which is determined by the frequency characteristics of a sensor and the composite characteristics of an electronic circuit processing an electric signal output from a sensor.

Figure 6A:
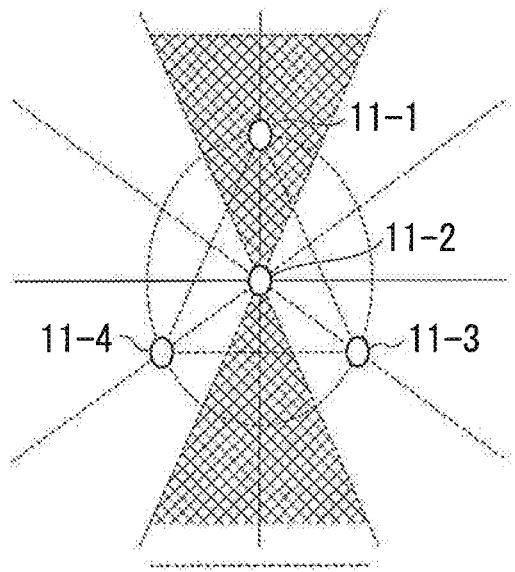
FIG. 6A is a diagram which shows an example of a detection range in the arrangement of sensors in the vector sensing unit according to the present embodiment.
Figure 6B:
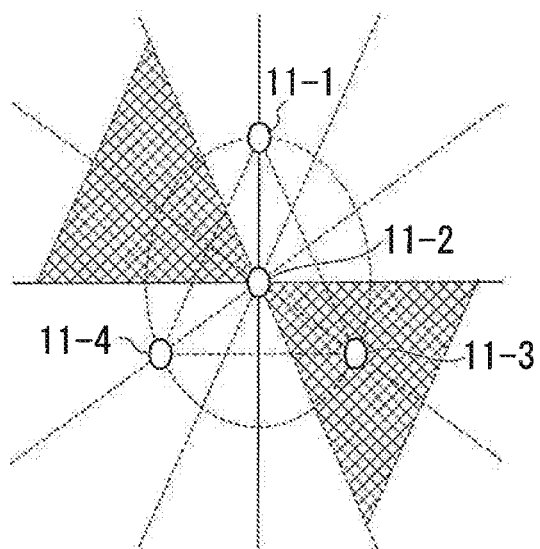
FIG. 6B is a diagram which shows an example of a detection range in the arrangement of sensors in the vector sensing unit according to the present embodiment.
Figure 6C:
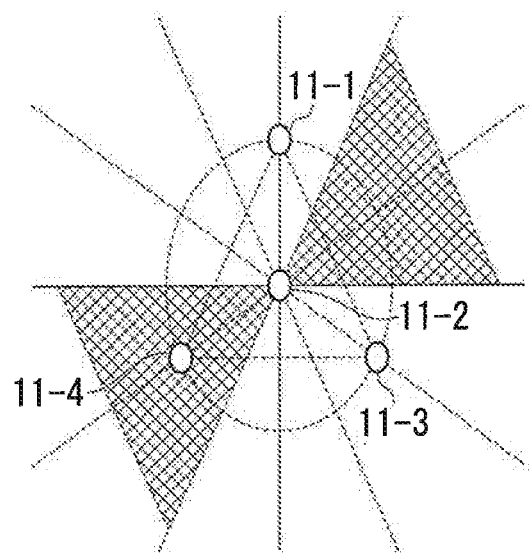
FIG. 6C is a diagram which shows an example of a detection range in the arrangement of sensors in the vector sensing unit according to the present embodiment.

FIGS. 6A, 6B and 6C is a diagram which shows an example of a detection range in the arrangement of sensors in the vector sensing unit 10 according to the present embodiment. FIG. 6A is a shows a detection range when the sensors 11-2, 11-3, and 11-4 are used. In FIG. 6A, a region (a hatched region) surrounded by a triangular dotted line is a detection range. FIG. 6B is a shows a detection range when the sensors 11-1, 11-2, and 11-4 are used. In FIG. 6B, a region (a hatched region) surrounded by a triangle dotted line is a detection region. FIG. 6C is a shows a detection range when the sensors 11-1, 11-2, and 11-3 are used. In FIG. 6C, a region (a hatched region) surrounded by a triangle dotted line is a detection range.

As described above, angle location can be performed without an influence of dead band over 360° by selectively using three of the sensors arranged in the vector sensing unit 10.

Figure 7:
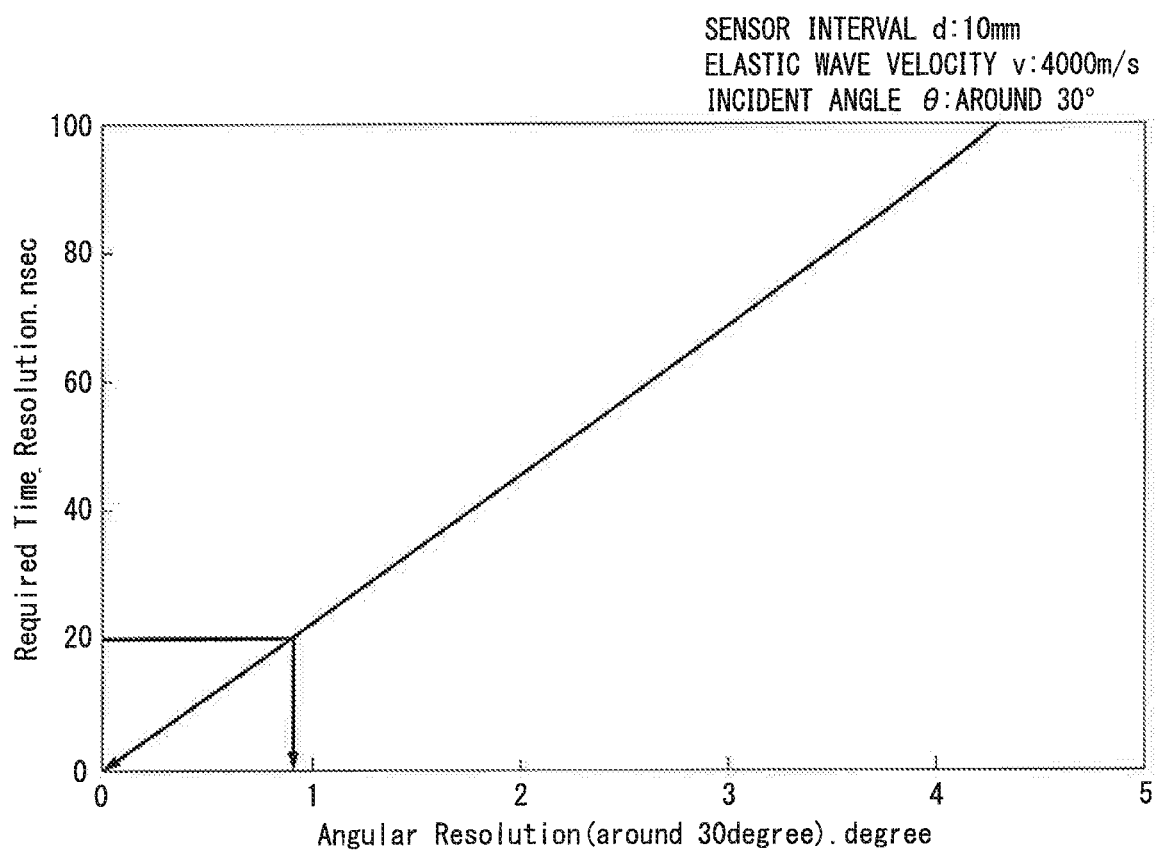
FIG. 7 is a diagram which shows a simulation result of detection resolution according to the present embodiment.

FIG. 7 is a diagram which shows a simulation result of detection resolution according to the present embodiment. In FIG. 7, the horizontal axis represents an angular resolution; and the vertical axis represents a required time. In a simulation shown in FIG. 7, it is assumed that the sensor interval d is 10 mm, the velocity v of elastic waves is 4000 m/s, and the incident angle θ is around 30°. In this case, it is seen that a change of approximately 20 nanoseconds occurs for an angle of 1°.

Figure 8:
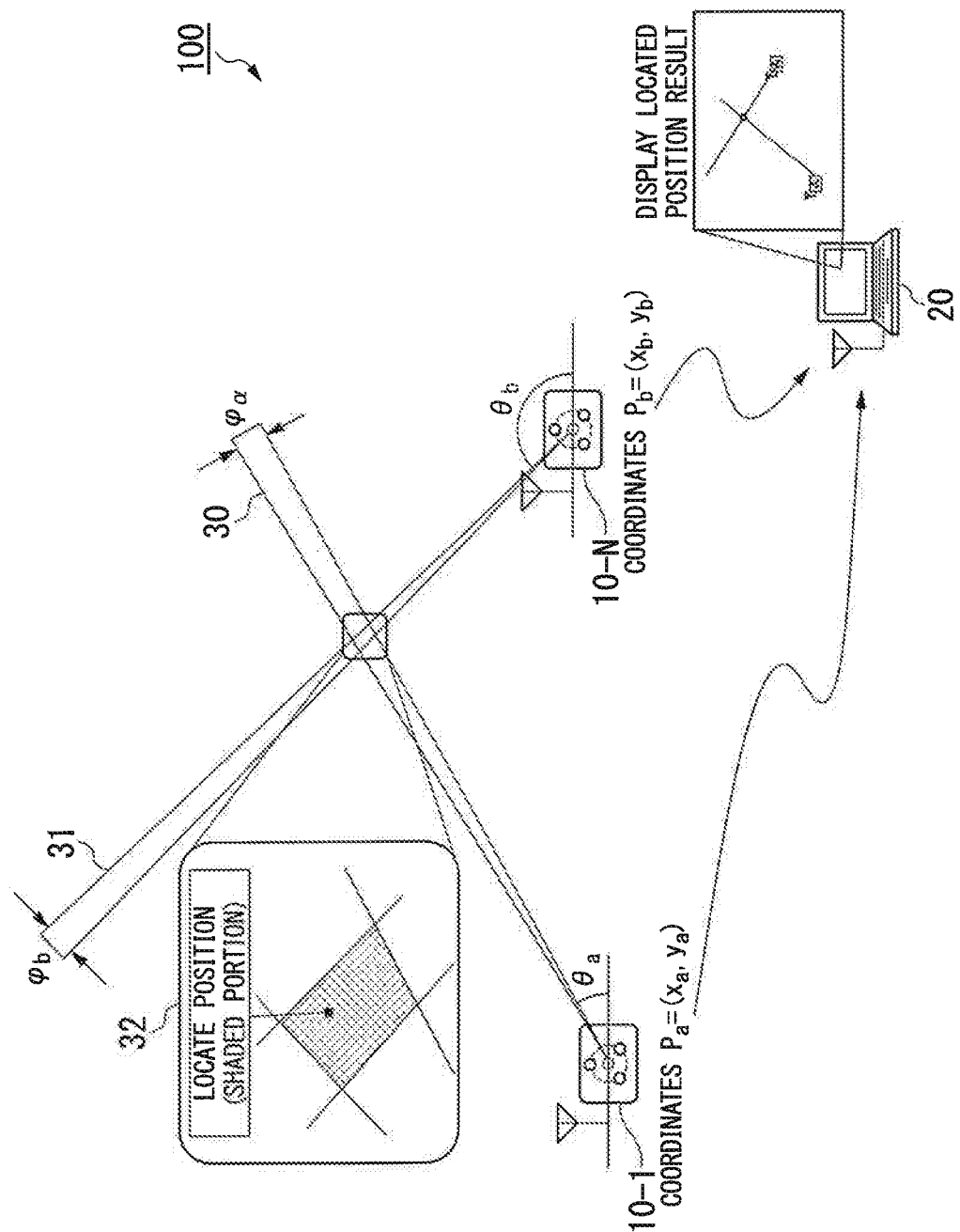
FIG. 8 is a diagram which shows a system configuration of a position location system according to the present embodiment.

FIG. 8 is a diagram which shows a system configuration of a position location system 100 according to the present embodiment. The position location system 100 includes a plurality of vector sensing units 10-1 and 10-2, and a server 20. An example in which locate position is performed by two vector sensing units 10-1 and 10-2 is shown in FIG. 8. In the following description, vector sensing units 10-1 to 10-N will be referred to as the vector sensing unit 10 as long as there is no distinction therebetween. The position location system 100 may include three or more vector sensing units 10. AE sensors are described as an example of sensors in the vector sensing unit 10 in the embodiment, but acceleration sensors may also be used instead of AE sensors.

The vector sensing unit 10 is adhered to a structure surface subjected to deterioration evaluation using an adhesive or the like. The vector sensing unit 10 has a wireless transmission function and transmits information on the arrival time of elastic waves (hereinafter, referred to as "arrival time information") and information on an incident angle (hereinafter, referred to as "incident angle information") to the server 20.

The server 20 extracts an event from the arrival time information. An event represents an event occurrence of elastic waves occurring in a structure. When a single event occurs due to the occurrence of cracks in a structure, elastic waves are detected at substantially the same time by the vector sensing unit 10. Based on a plurality of pieces of incident angle information corresponding to the same event and the coordinate information of each vector sensing unit 10, the position location of the transmission source of elastic waves is performed. The coordinate information of each vector sensing unit 10 is stored by the server 20 in advance. The same event represents an event in which the arrival time is within the range of a predetermined time window.

In FIG. 8, the server 20 sets an intersection between a straight line 30 starting from the coordinate position Pa of the vector sensing unit 10-1 and extending in the direction of an incident angle θa and a straight line 31 starting from the coordinate position Pb of the vector sensing unit 10-2 and extending in the direction of an incident angle θb as an location position Pb of the transmission source of elastic waves. However, strictly speaking, angle information includes an angle error in accordance with a detectable time resolution, and the location position detected by one vector sensing unit 10 is not on a straight line, but is a region with a fan-shaped width. Therefore, as shown in FIG. 8, the intersection (a shaded portion in an image 32 of FIG. 8) of the two fan-shaped regions is the location position of the transmission source of elastic waves in practice. The area of the shaded portion can also be used as an indicator indicating the uncertainty of location.

Figure 9:
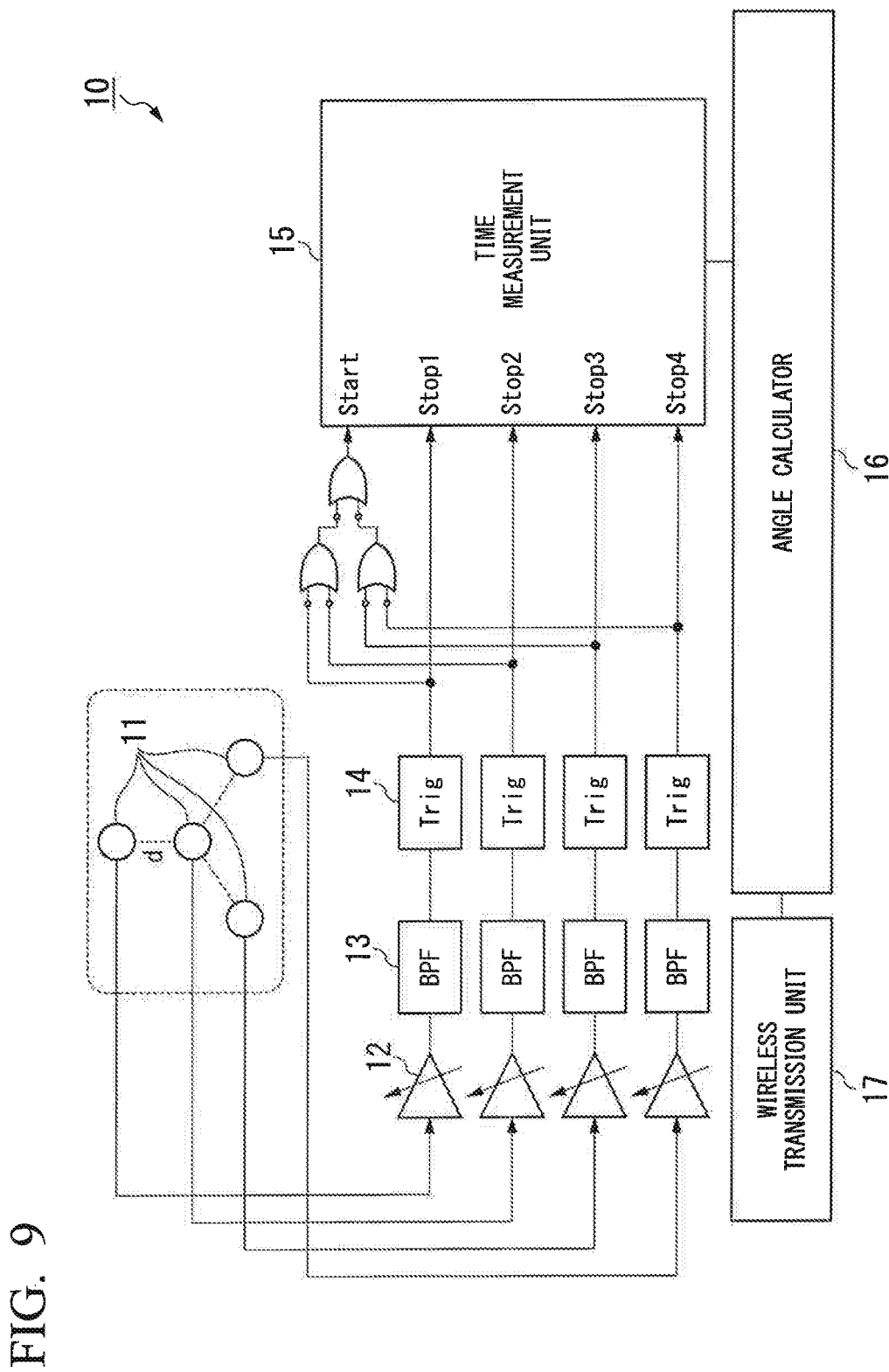
FIG. 9 is a block diagram which shows a functional configuration of the vector sensing unit.

FIG. 9 is a block diagram which shows a functional configuration of the vector sensing unit 10.

The vector sensing unit 10 includes a plurality of AE sensors 11, a plurality of power amplifiers 12, a plurality of BPFs 13, a plurality of trigger generation units 14, a time measurement unit 15, an angle calculator 16, and a wireless transmission unit 17. The AE sensors 11 in the vector sensing unit 10 are arranged so that straight lines connecting respective sensors are not parallel to each other as shown in FIG. 5. Respective AE sensors 11 are connected to the power amplifier 12.

The AE sensor 11 detects elastic waves generated from a structure. The AE sensor 11 includes a piezoelectric element, detects elastic waves generated from a structure, and converts the detected elastic waves into a voltage signal (AE source signal). The AE sensor 11 outputs an AE source signal to the power amplifier 12.

The power amplifier 12 amplifies the AE source signal output from the AE sensor 11.

The BPF 13 is a band pass filter which removes noise outside a measurement band. The BPF 13 removes noise outside of the measurement band from the AE source signal amplified by the power amplifier 12.

The trigger generation unit 14 detects the arrival of a signal and outputs a trigger.

The time measurement unit 15 measures a difference in time at which elastic waves arrive at respective AE sensors 11. For example, the time measurement unit 15 may set a logical OR of four trigger signals as a start trigger, sets the four trigger signals as stop triggers 1 to 4, measure the time from the start trigger to the stop trigger, and output a result of the measurement to the angle calculator 16 as time information.

The angle calculator 16 calculates the incident angle of elastic waves incident on each AE sensor 11 on the basis of time information output from the time measurement unit 15.

The wireless transmission unit 17 transmits information on the calculated incident angle of elastic waves wirelessly to the server 20. The wireless transmission unit 17 adds identification information for identifying the vector sensing unit 10 to the information on an incident angle and transmits the information to the server 20.

Figure 10:
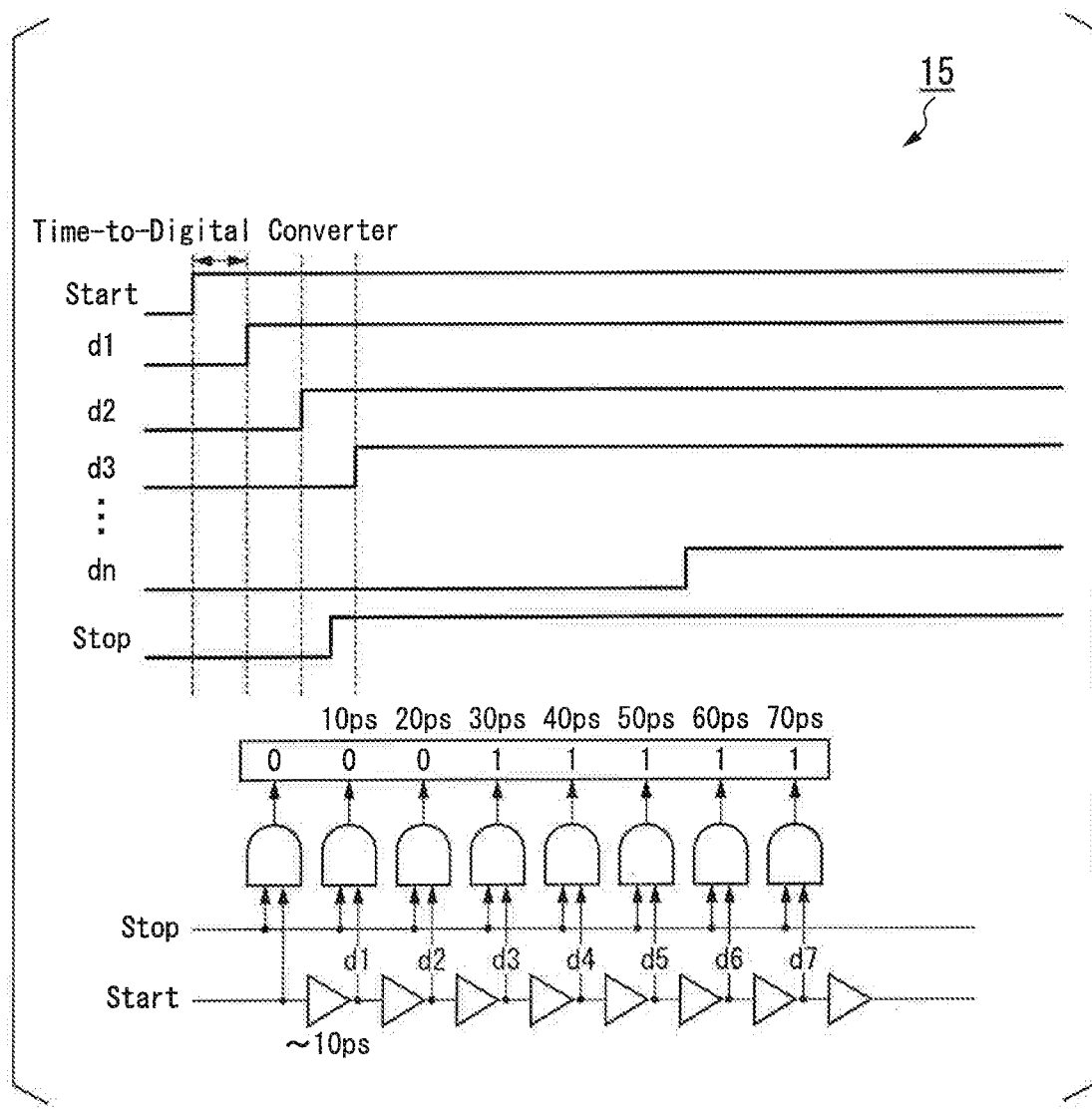
FIG. 10 is a diagram which shows an example of a time measurement unit.

FIG. 10 is a diagram which shows an example of a time measurement unit 15.

As shown in FIG. 10, a Time-To-Digital Converter is used as an example of the time measurement unit 15 in the present embodiment. Any constituent may be used as the time measurement unit 15 as long as it can measure a difference in arrival time of elastic waves. As shown in FIG. 10, there is a method of taking a logical OR of a start pulse and a stop pulse that have passed through a plurality of stages of logic gates in the Time-To-Digital Converter. This method is a method of measuring a time difference by a product of the number of delay gates whose outputs have changed and a delay time per gate. The delay time per gate is, for example, an order of about 10 ps, and time difference measurement with high accuracy is possible.

Figure 11:
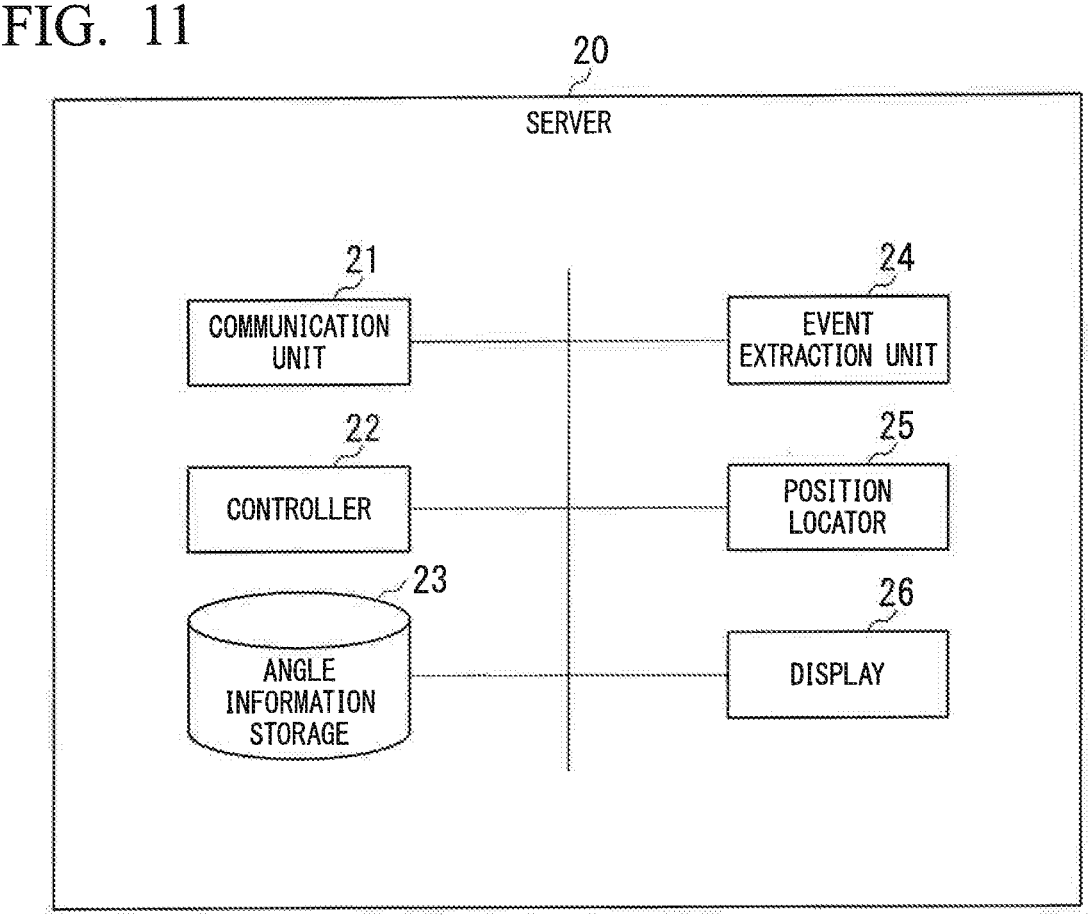
FIG. 11 is a block diagram which shows a functional configuration of a server.

FIG. 11 is a block diagram which shows a functional configuration of a server 20.

The server 20 includes a Central Processing Unit (CPU), a memory, an auxiliary storage device, and the like connected by a bus, and executes a position location program. By executing the position location program, the server 20 functions as a device including a communication unit 21, a controller 22, an angle information storage 23, an event extraction unit 24, a position locator 25, and a display 26. All or some of the functions of the server 20 may be realized using hardware such as an Application Specific Integrated Circuit (ASIC), a Programmable Logic Device (PLD), and a Field Programmable Gate Array (FPGA). In addition, the position location program may be recorded on a computer-readable recording medium. The computer-readable recording medium is, for example, a portable medium such as a flexible disk, a magneto-optical disc, a ROM, or a CD-ROM, or a storage device such as a hard disk built in a computer system. Moreover, the position location program may be transmitted and received via an electric communication line.

The communication unit 21 receives incident angle information transmitted from the vector sensing unit 10.

The controller 22 controls each functional unit of the server 20. For example, the controller 22 causes the angle information storage 23 to store incident angle information received by the communication unit 21.

The angle information storage 23 is constituted using a storage device such as a magnetic hard disk device or a semiconductor storage device. The angle information storage 23 stores incident angle information. The angle information storage 23 may be a volatile memory such as a memory.

The event extraction unit 24 extracts incident angle information generated in a single event from the incident angle information stored in the angle information storage 23.

The position locator 25 performs the position location based on the extracted incident angle information and identifies a position of the source of elastic waves.

The display 26 is an image display device such as a liquid crystal display or an organic Electro Luminescence (EL) display. The display 26 displays the position information of the source of elastic waves, which is identified by the position locator 25. The display 26 may be an interface for connecting an image display device to the communication device 10. In this case, the display 26 generates a video signal for displaying the position information of the source of elastic waves, and outputs the video signal to an image display device connected thereto.

Figure 12:
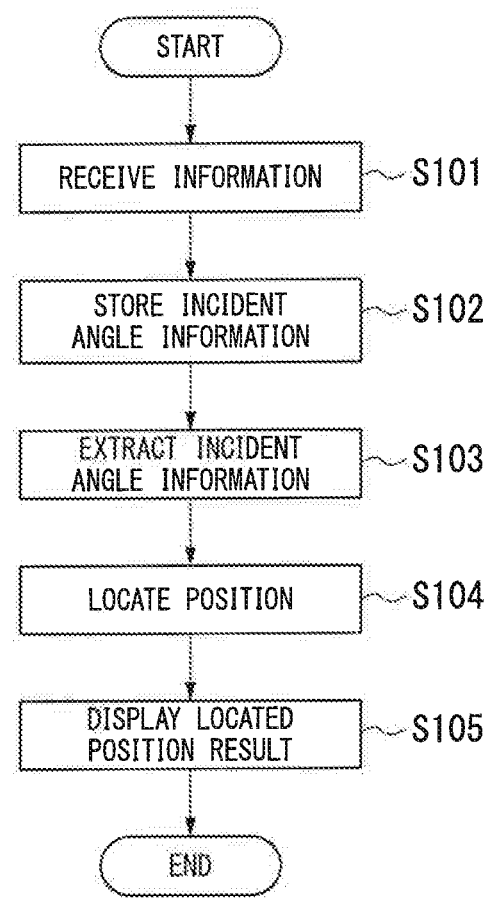
FIG. 12 is a flowchart which shows a flow of processing of the server.

FIG. 12 is a flowchart which shows a flow of processing of the server 20.

The communication unit 21 receives incident angle information transmitted from the vector sensing unit 10 (step S101). The communication unit 21 outputs the received incident angle information to the controller 22. The controller 22 causes the angle information storage 23 to store the incident angle information output from the communication unit 21 (step S102). For example, the controller 22 causes the angle information storage 23 to store incident angle information for each piece of identification information of the vector sensing unit 10. The communication unit 21 and the controller 22 repeatedly execute the processing of steps S101 and S102 whenever incident angle information is transmitted from the vector sensing unit 10.

The event extraction unit 24 extracts incident angle information generated in a single event from the incident angle information stored in the angle information storage 23. The event extraction unit 24 provides a predetermined time window and extracts all pieces of incident angle information whose arrival time exists within the time window as incident angle information in a single event (step S103). The event extraction unit 24 outputs the extracted incident angle information to the position locator 25. The position locator 25 performs position location on the basis of the output incident angle information (step S104). For example, when the output incident angle information is incident angle information transmitted from one vector sensing unit 10, the position locator 25 locates a direction of a position of the source of elastic waves on the basis of coordinate information of the vector sensing unit 10 as a transmission source of the incident angle information and the incident angle information. When the output incident angle information is incident angle information transmitted from a plurality of vector sensing units 10, the position locator 25 locates the position of the source position of elastic waves in the method described in FIG. 8. Thereafter, the position locator 25 outputs a position location result to the display 26. The display 26 displays the position location result (step S105).

For example, the display 26 may display the position of the source of elastic waves in coordinates, may display it on the map, or may display it in other methods.

According to the position location system 100 configured as described above, the difference in time at which elastic waves arrive at each AE sensor 11 is measured using the vector sensing unit 10 including a plurality of AE sensors 11, the incident angle of elastic waves is calculated based on the measured time difference, and the source of elastic waves is located based on the calculated incident angle. The plurality of AE sensors 11 are arranged such that straight lines connecting each of the AE sensors 11 are not parallel. As a result, a wide range (for example, 360°) can be set as a measurement range without being affected by a dead band. Furthermore, it is possible to easily expand the measurement range by using a plurality of vector sensing units 10. For this reason, it is possible to expand the measurement range of elastic waves without being affected by a dead band.

Figure 13A:
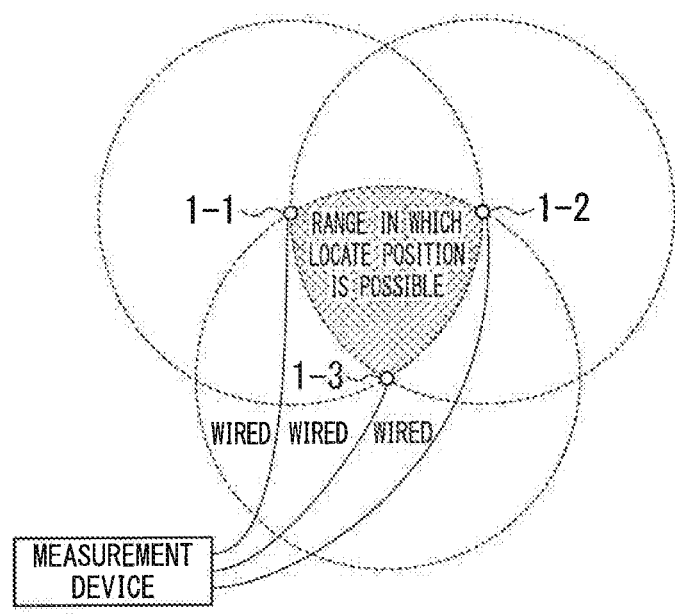
FIG. 13A is a diagram which shows a configuration of a conventional position location.
Figure 13B:
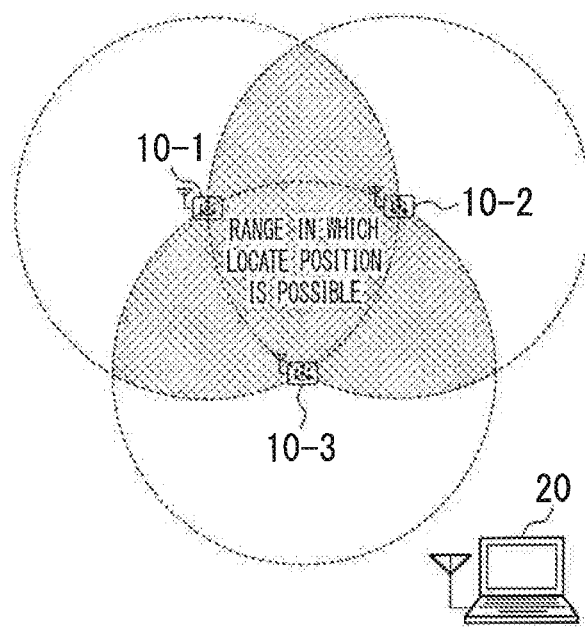
FIG. 13B is a diagram which shows a configuration of a present embodiment position location.

Effects of the present embodiment will be described with reference to FIGS. 13A and 13B. FIG. 13A is a diagram which shows a configuration of a conventional position location. FIG. 13B is a diagram which shows a configuration of a present embodiment position location. As shown in FIG. 13A, in the configuration of the conventional position location, it is necessary to surround a measurement range using at least three sensors 1-1 to 1-3 and strict synchronization between the sensors is required, and thus connection using a wire has been required. Moreover, an accurate value for a propagation velocity has been required. Unlike a sound velocity in the air, the velocity of elastic waves that propagate in solids varies largely depending on an internal structure, and there are some materials having anisotropy, and thus it is difficult to determine an accurate sound velocity in some cases.

In contrast, in the configuration of the position location according to the present embodiment shown in FIG. 13B, if there are two or more vector sensing units 10, it is possible to perform a plane position location, and it is possible to widen a measurement range as compared to in a conventional method shown in FIG. 13A. In addition, it is possible to expand the measurement range simply by adding another vector sensing unit 10. In addition, since a result of the position location does not depend on a propagation velocity, previous speed information is unnecessary in principle. In addition, since time accuracy between the vector sensing units 10 does not depend on accuracy in position location, time synchronization accuracy can be greatly relaxed. As a result, relaxation of required time synchronization accuracy facilitates wirelessization of the units of the vector sensing units 10. Hereinafter, a modification of the position location system 100 will be described.

The vector sensing unit 10 may be configured not to include the angle calculator 16 and to transmit only time difference information to the server 20. With such a configuration, the server 20 further includes an angle calculation unit. The processing of the angle calculation unit is the same as that of the angle calculator 16.

The server 20 may be configured to synchronize each vector sensing unit 10 by transmitting a reference time signal to each vector sensing unit 10. In such a configuration, the controller 22 controls the communication unit 21 such that it transmits a reference time signal including a reference time to each vector sensing unit 10. Each vector sensing unit 10 updates its own time on the basis of a received reference time signal. As a result, it is possible to accurately extract incident angle information on the server 20. Moreover, it is also possible to perform time correction after data accumulation to maximize cross-correlation of point process chronological order data obtained from each vector sensing unit 10 as another method.

Figure 14A:
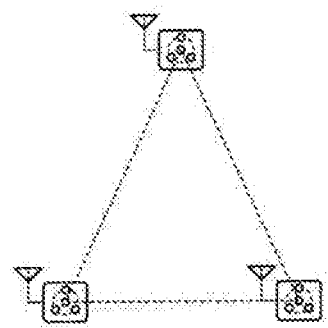
FIG. 14A is a diagram which shows an arrangement example when the position location system includes three vector sensing units.
Figure 14B:
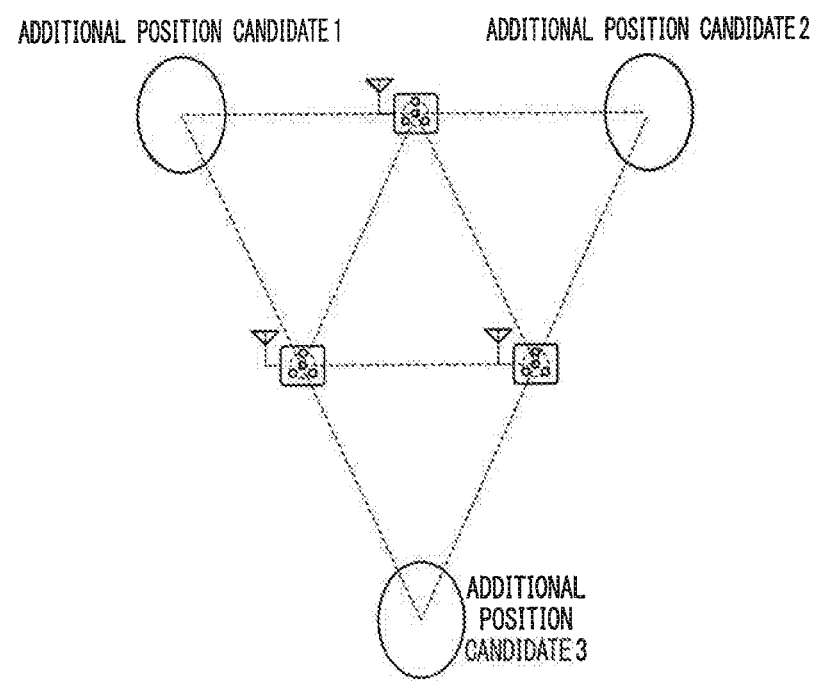
FIG. 14B is a diagram which shows an example of an arrangement candidate when the position location system 100 includes four or more vector sensing units.

FIG. 14A is a diagram which shows an arrangement example when the position location system 100 includes three vector sensing units 10. FIG. 14B is a diagram which shows an example of an arrangement candidate when the position location system 100 includes four or more vector sensing units 10. As shown in FIG. 13B, since a region in which measurement ranges of at least two vector sensing units 10 overlap is a region subjected to deterioration evaluation, the vector sensing unit 10 may be disposed at a position of the vertex of an approximately equilateral triangle as shown in FIG. 14B. A length of one side of the equilateral triangle is a distance determined based on distance attenuation characteristics of elastic waves, and can be set to be, for example, 1 m. When a region subjected to deterioration evaluation is expanded, it is possible to expand the region subjected to deterioration evaluation most efficiently by additionally disposing the vector sensing unit 10 at the position of the vertex of the approximately equilateral triangle having a line segment connecting two of the vector sensing units 10 already installed as one side. The approximately equilateral triangle, if it is a rough equilateral triangle, does not need to have apex angles which are exactly 60°, and may be any triangle shape arranged such that the apex angles are in a range of 45° to 75° to obtain the effects.

According to at least one embodiment described above, the position location system includes a plurality of sensors, a time measurement unit, an angle calculation unit, and a position location unit. A plurality of sensors are arranged at a distance interval on the basis of the sound velocity of elastic waves propagating inside a structure and the frequency characteristic of a sensor. The time measurement unit measures a difference in time at which elastic waves arrive at the plurality of sensors. The angle calculation unit calculates an incident angle at which elastic waves are incident on the plurality of sensors on the basis of the time difference. The position locator locates the source of the elastic waves on the basis of the incident angle. With such a configuration, it is possible to expand the measurement range of elastic waves without being affected by a dead band.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A position location system comprising:
    a plurality of sensors arranged at a predetermined sensor interval;
    a time measurement unit configured to measure a difference in time at which elastic waves arrive at the plurality of sensors;
    an angle calculation unit configured to calculate an incident angle at which the elastic waves are incident on the plurality of sensors on the basis of the time difference; and
    a position locator configured to locate a source of the elastic waves on the basis of the incident angle, wherein the predetermined sensor interval is a distance determined on the basis of a velocity of elastic waves propagating in a structure in which the plurality of sensors are arranged and a frequency characteristic of the sensor.

2. The position location system according to claim 1, wherein a predetermined sensor interval d satisfies d<v/f if the propagation velocity of the elastic waves is set as v, and the frequency to be observed is set as f, wherein the frequency to be observed is determined by the frequency characteristic of a sensor and by the composite characteristic of an electronic circuit processing an electric signal output from the sensor.

3. The position location system according to claim 1, wherein the plurality of sensors are four or more sensors arranged in a predetermined layout, and
the predetermined layout is a layout in which a plurality of line segments connecting the plurality of sensors are not parallel to each other.

4. The position location system according to claim 1, wherein three or more vector sensing units including at least the plurality of sensors and the time measurement unit are provided, and
the vector sensing units are arranged at positions which are vertexes of an approximately equilateral triangle.

5. The position location system according to claim 4, wherein, when a detection range is expanded, a new vector sensing unit is provided at a position which is one remaining vertex of an approximately equilateral triangle having a line segment connecting two of the vector sensing units as one side.

6. The position location system according to claim 4, further comprising:
a communication unit configured to wirelessly transmit information on a reference time to the vector sensing unit,
wherein time of the vector sensing unit is corrected.

7. A position location method comprising:
measuring a difference in time at which elastic waves arrive at a plurality of sensors arranged at a predetermined sensor interval;
calculating an incident angle at which the elastic waves are incident on the plurality of sensors on the basis of the time difference; and
locating a source of the elastic waves on the basis of the incident angle,
wherein the predetermined sensor interval is a distance determined on the basis of a velocity of elastic waves propagating inside a structure in which the plurality of sensors are arranged and a frequency characteristic of the sensor.

8. A non-transitory computer readable storage medium that stores a computer program to be executed by the computer to perform:
measuring a difference in time at which elastic waves arrive at a plurality of sensors arranged at a predetermined sensor interval;
calculating an incident angle at which the elastic waves are incident on the plurality of sensors on the basis of the time difference; and
locating a source of the elastic waves on the basis of the incident angle,
wherein the predetermined sensor interval is a distance determined on the basis of a velocity of elastic waves propagating inside a structure in which the plurality of sensors are arranged and a frequency characteristic of the sensor.

* * * * *